(12) United States Patent
Wang et al.

(10) Patent No.: US 8,805,899 B2
(45) Date of Patent: Aug. 12, 2014

(54) DATA CHANNEL UTILIZATION MANAGEMENT IN MULTI-USER SYSTEM

(75) Inventors: Huei Chung Wang, Kirkland, WA (US); Amjad Hussain, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 13/293,019

(22) Filed: Nov. 9, 2011

(65) Prior Publication Data

US 2013/0117336 A1  May 9, 2013

(51) Int. Cl.
*G06F 17/30* (2006.01)

(52) U.S. Cl.
USPC .............................................. 707/822; 710/36

(58) Field of Classification Search
USPC ................................ 707/821, 822, 827; 710/36
See application file for complete search history.

(56) References Cited

U.S. PATENT DOCUMENTS

| | | | |
|---|---|---|---|
| 7,725,583 B2 | 5/2010 | Jackson | |
| 7,996,842 B2 | 8/2011 | Savit | |
| 2007/0256077 A1 | 11/2007 | Zhong | |
| 2008/0103861 A1 | 5/2008 | Zhong | |
| 2009/0187784 A1 | 7/2009 | Bernardi et al. | |
| 2011/0040903 A1* | 2/2011 | Sterns et al. | 710/39 |
| 2011/0082950 A1* | 4/2011 | Mine et al. | 710/36 |
| 2011/0088030 A1* | 4/2011 | Agesen et al. | 718/1 |

OTHER PUBLICATIONS

Tsakalozos, et al., "Adaptive Disk Scheduling with Workload-dependent Anticipation Intervals", In Journal of Systems and Software, vol. 82, Issue 2, Feb. 2009, pp. 274-291.

Freund, et al., "Scheduling Resources in Multi-User, Heterogeneous, Computing Environments with SmartNet", In Proceedings of the Seventh Heterogeneous Computing Workshop, Mar. 30, 1998, pp. 184-199.

Zaharia, et al., "Job Scheduling for Multi-User MapReduce Clusters", In Proceedings of Technical Report UCB/EECS, Apr. 30, 2009, 18 pages.

\* cited by examiner

*Primary Examiner* — Khanh Pham
(74) *Attorney, Agent, or Firm* — Jim Sfekas; Raghu Chinagudabha; Micky Minhas

(57) ABSTRACT

The management of data storage channel utilization in a computing system that has multiple users. The system receives file-level requests from requesters and then creates a history for each requester. Upon evaluating the history of each requester, the system determines whether to delay the file-level requests from entering the file system stack based on the result of the evaluation. The system delays one or more of the file-level requests if the history of the corresponding requester meets one or more criteria. If the history of the corresponding requester does not meet the criteria, the system allows the file-level requests to be passed to the file system stack without being delayed.

18 Claims, 4 Drawing Sheets

DATA CHANNEL UTILIZATION MANAGEMENT IN MULTI-USER SYSTEM

BACKGROUND

While computing systems used to be solely stand-alone computing systems, modern computing network have enabled for resources to be shared. For instance, corporate networks are now conventionally structured to allow data storage space to be shared amongst multiple users. This removes the requirement that each user has its own individual data storage space. Besides the storage space, the multiple users also share the data Input/Output ("I/O") channel when they instruct the computing system to read or write an electronic file from or to the storage medium including hard disk and flash memory.

When one of the users submits a request that requires the reading or writing operation of the system, the system processes the request and permits the operation. However, unlike storage space, the data I/O channel is finite and hard to expand. Storage medium manufacturers spend significant efforts on improving the data I/O channel, and developing new storage mediums (e.g., Solid State Disk). Other technology uses hardware modification, such as dual-channel memory, to improve the data I/O channel.

BRIEF SUMMARY

At least one embodiment described herein relates to the management of data storage channel utilization in a computing system that has multiple users. The system receives file-level requests from requesters and then creates a history for each requester. Upon evaluating the history of each requester, the system determines whether to delay the file-level requests from entering the file system stack based on the result of the evaluation. The system delays one or more of the file-level requests if the history of the corresponding requester meets one or more criteria. If the history of the corresponding requester does not meet the criteria, the system allows the file-level requests to be passed to the file system stack without being delayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the management of data storage channel utilization in a computing system that has multiple users is described. The system receives file-level requests from requesters and then creates a history for each requester. Upon evaluating the history of each requester, the system determines whether to delay the file-level requests from entering the file system stack based on the result of the evaluation. The system delays one or more of the file-level requests if the history of the corresponding requester meets one or more criteria. If the history of the corresponding requester does not meet the criteria, the system allows the file-level requests to be passed to the file system stack without being delayed. After describing a general computing system that may be used to implement aspects of the principles described herein, more regarding the management of data storage channel utilization will be described with respect to FIG. 2 through FIG. 4.

Figure 1:
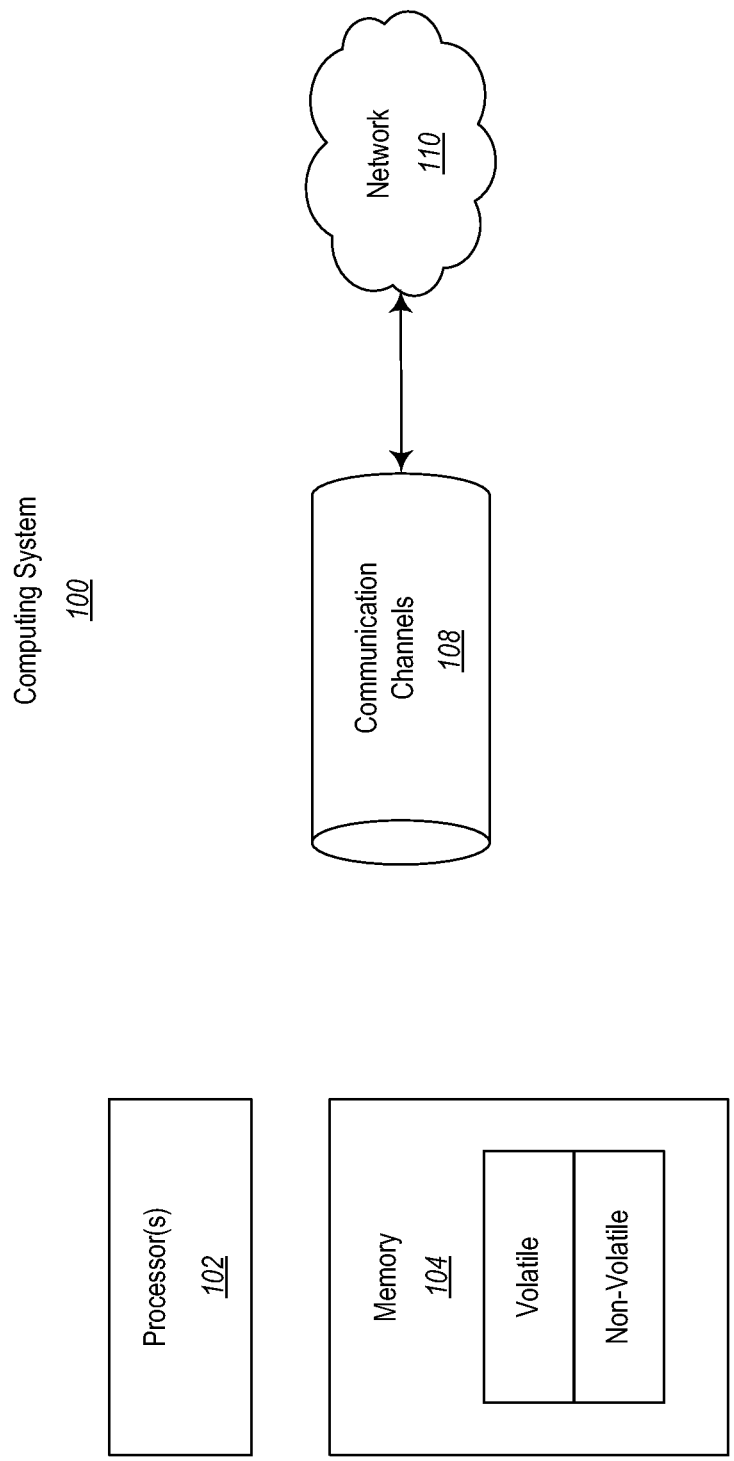
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
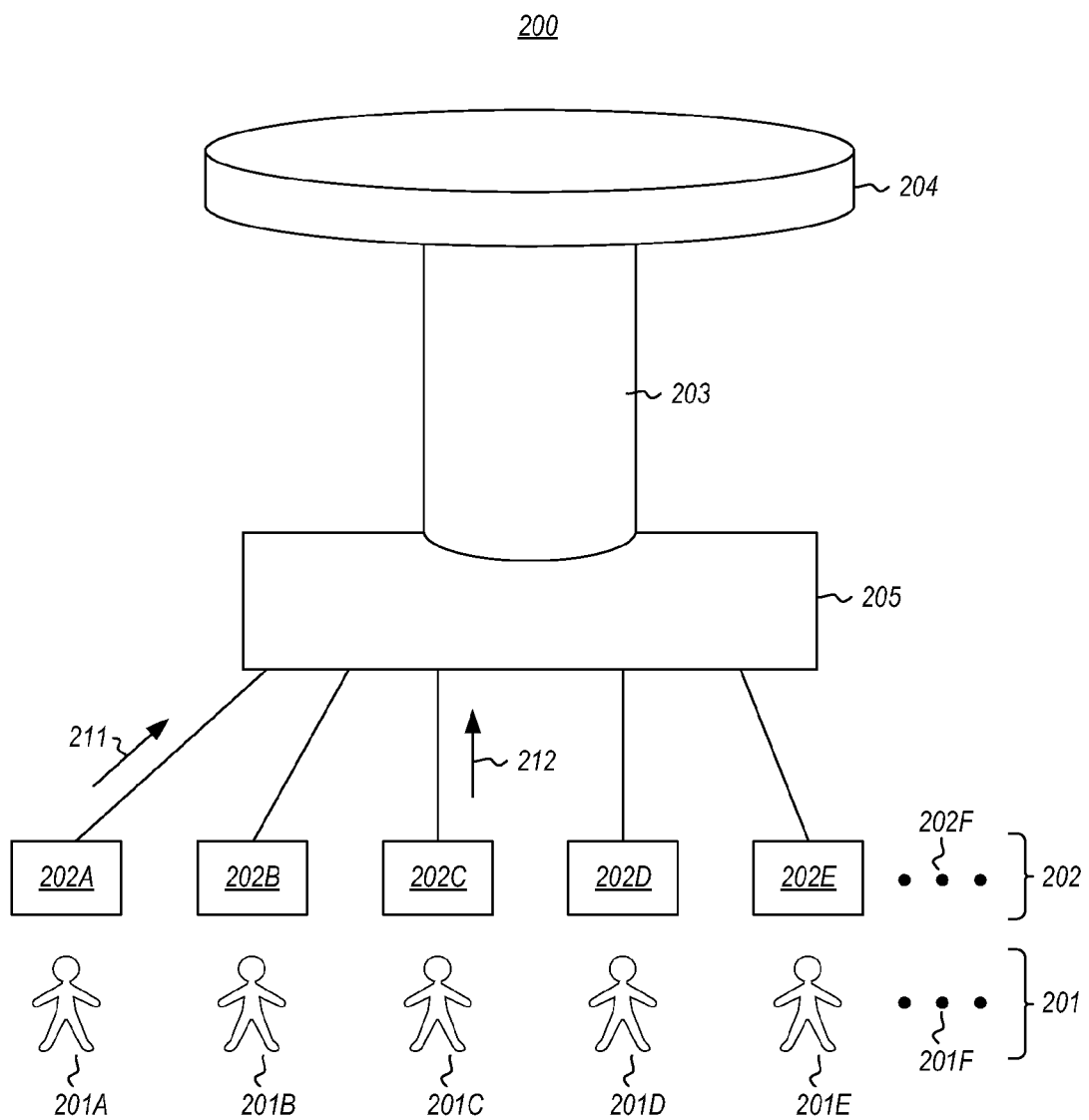
FIG. 2 illustrates an example multi-user computing system in which multiple users use an input/output (I/O) module to sharing a data storage channel for access to storage space in accordance with embodiments described herein.

FIG. 2 illustrates a multi-user computing system 200 that may be used to employ embodiments described herein. The multi-user computing system 200 includes an I/O module 205 that communicates with a storage space 204 through a limited data storage channel 203. The storage space 204 can be any storage space. For instance, the storage space 204 can be hard disk, memory, flash disk, or cloud storage space on a cluster of physically separated storage medium at different physical locations. Regardless, the storage space 204 has a finite amount of available data storage channel as represented by channel 203. For example, the USB 3.0 specification provides 4.8 Gbps as top speed but it is still finite.

The multi-user computing system 200 involves multiple users 201. As illustrated in FIG. 2, the multiple users 201 are shown as including five users 201A, 201B, 201C, 201D, and 201E. However, the ellipses 201F symbolize that the principles described herein may apply to any multi-user system in which there are multiple users accessing a shared but limited data storage channel 203. As an example, there may be as few as two such users, but there might also be as many as thousands or perhaps more users in such a system. Accordingly, FIG. 2 should only be interpreted as an example multi-user computing system only.

Each user 201 uses a corresponding client 202. For instance, users 201A through 201E use corresponding clients 202A through 202E. Again, the ellipses 202F represent that there may be any number of such clients since there may be any number of such users. Furthermore, although there is illustrated a one-to-one correspondence between users and clients, the principles described herein are not limited to that correspondence. For instance, there may be a single user that uses multiple clients, or, in some cases, one or more users can share a same client but work on different interfaces and the users still essentially share the limited data storage channel 203.

Each client 202 is connected to the I/O module 205. The clients access the storage space 204 through the limited data storage channel 203 and request various reading or writing operations to the storage space 204. For instance, a reading request 211 (sent from client 202A) and a writing request 212 (sent from 202C) will be delivered to the I/O module 205. The I/O module 205 may perform a method for managing data storage channel utilization described herein. In that case, the I/O module 205 will handle the reading request 211 and the writing request 212 respectively.

In some embodiments, the I/O module 205 may perform the acts attributed to the I/O module 205 hereinafter by using hardware, software, or a combination of hardware and software. In the case of software, the I/O module 205 may be an example of the computing system 100 of FIG. 1. In that case, the I/O module might perform the method in response to the processor(s) 102 executing computer-executable instruction that were on one or more computer-readable media (e.g., memory 104) that form part of the computer program product.

Figure 3:
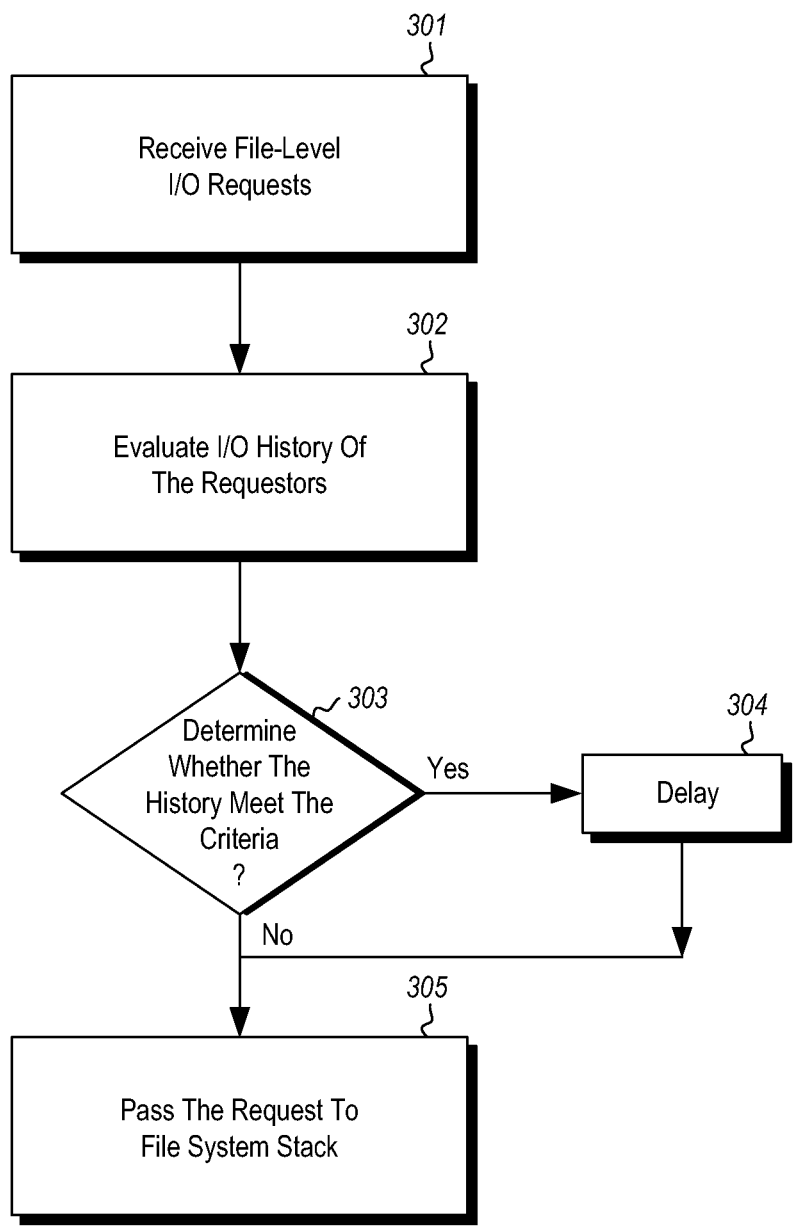
FIG. 3 illustrates a flowchart of an example method for managing data storage channel utilization, that may for example be performed by the I/O module of FIG. 2, in accordance with embodiments described herein.

FIG. 3 illustrates an example method 300 for managing data storage channel utilization that may be used to employ embodiments described herein. The method 300 may perhaps be performed each time the I/O module 205 receives requests, although that is not required. As the method 300 may be performed by the I/O module 205 in the multi-user computing system 200 of FIG. 2, the method 300 will now be described with frequent reference to the system 200 of FIG. 2.

In some embodiments, the I/O module 205 performs the method 300 when there are multiple (e.g., two or more) file-level I/O requests. The I/O module 205 receives multiple file-level I/O requests (act 301) and evaluates an I/O history of each corresponding requester (act 302). The multiple file-level I/O requests may comprise reading requests, writing requests, or a combination thereof. The requesters might be clients 202, applications running on clients 202, different sessions, or indentified users 201. The I/O history may be created based on the statistical data of the corresponding requester's previous I/O requests.

In order to determine whether to delay the file-level I/O requests, the I/O module 205 then compares the I/O history of the corresponding requester with one or more criteria (decision block 303). In some embodiments, the criteria may be pre-determined before the I/O module receives the I/O requests and remain the same thereafter. In some other embodiments, the criteria may be calculated each time the I/O module 205 performs the method 300, and thus may change over time.

If the I/O history of the corresponding requester meets the criteria, the I/O module determines to delay the file-level requests (act 304). After the requests are delayed for a period of time, the requests may be passed to the file system stack (act 305). Similarly, the period of time can be pre-determined before the performance of method 300 and also can be calculated each time the I/O module 205 performs the method 300. For instance, the period of time for delaying may be determined by the I/O history of the requester, the number of clients, the size of the data storage channel 203, or an algorithm considering a combination or subcombination of the factors. However, during the period of time, the I/O module 205 may determine to stop delaying the requests and allow the requests to be passed to the file system stack.

If the I/O history of the corresponding requester does not meet the criteria, the I/O module 205 allows the file-level I/O requests to be passed to the file system stack without being delayed (act 305, without first performing act 304).

For instance, take as an example, a case in which there are two file-level I/O requests (e.g., request 211 and request 212 of FIG. 2), the I/O module 205 may perform the method 300 as described herein on those two requests 211 and 212. The two file-level I/O requests are named as "first file-level I/O request" and "second file-level I/O request" respectively. As used in this description and in the claims, the terms "first", "second", and so forth, do not imply any sequence of time, quality, ordering, position, or the like, and thus should not be interpreted as limiting the method 300 or the claims.

As to the first file-level I/O request 211, the I/O module 205 receives the first file-level I/O request (act 301) and creates a history for the corresponding requester (e.g., requester 201A and/or 202A—called hereinafter a "first requester" for convenience) based on the statistics of the requester's previous requests. The I/O module 205 then evaluates the I/O history (act 302) and determines that the first file-level I/O request 211 should be delayed (Yes in decision block 303) from entering the file system stack based on the I/O history of the first requester 201A and/or 202A. In some cases, the act of causing the first file-level I/O request to be delayed (act 304) may be performed by a component. This component adds the first file-level I/O request to a queue. The queue may be scheduled based on different priorities assigned to each requester. Such priorities may be predetermined or may be recalculated periodically and/or in response to particular events. Alternatively or in addition, the priorities may be calculated based on a scheduling algorithm. For example, the scheduling algorithm can assign the priorities considering the I/O histories of the requesters, the number of clients, the size of the data storage channel 203, or a combination of thereof.

After the delay, the I/O module 205 allows the first file-level I/O request 211 to be passed to the file system stack (act 305). Meanwhile, the component removes the first file-level I/O request from the queue and changes the priorities of the other file-level I/O requests still remaining in the queue accordingly.

As to the second file-level I/O request (see request 212 of FIG. 2), similarly, the I/O module 205 receives the second file-level I/O request 212 (act 301) and evaluates a history (act 302) for the corresponding requester 201C and/or 202C (called "the second requester" herein for the purpose of convenience). For instance, the first requester may be the same as the second requester because the different requests are sent at different time. Accordingly, the history of the same requester can be different at different times and then causes different determinations as to whether to delay the request or not. In most cases, the first requester can be different from the second requester and both are included in a group of requesters sharing access to the data storage channel.

Unlike the first file-level I/O request 211, the I/O module 205 determines not to delay the second file-level I/O request 212 (No in decision block 303) and the second file-level I/O request is then passed to the file system stack without being delayed.

In some embodiments (such as the case described with respect to FIG. 4) during the performance of method 300, a filter manager may be placed above the file system stack. The filter manager may be configured to allow interception of multiple file-level I/O requests including the first file-level I/O request 211 and the second file-level I/O request 212 to allow further processing to be applied to the requests that are not provided by the file system stack itself.

As one embodiment, after the requests are passed to the file system stack and the corresponding requested operations are finished, the file system stack may send feedback notifications indicating the operations are completed. Then the I/O module 205 may update the histories for the requesters accordingly. For example, the I/O history of a requester that just finished a 40 GB writing operation may be affected negatively and the I/O module 205 may determine to delay the next file-level request of that requester. After the completion of the previous requests, the I/O module 205 may also allow the next request in the queue to be passed to the file system stack.

Figure 4:
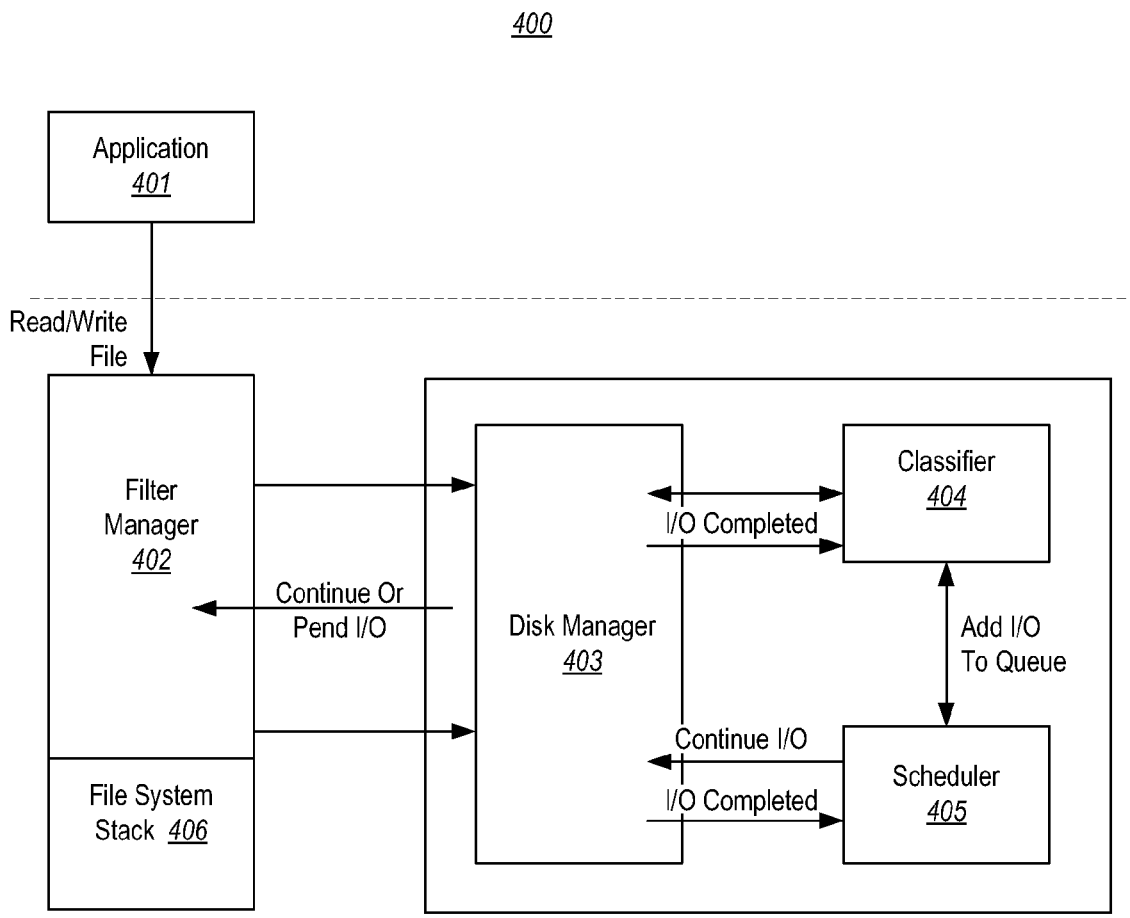
FIG. 4 illustrates an example system architecture that represents an example of how the I/O module of FIG. 2 may be structured as just one example.

FIG. 4 illustrates an example system architecture 400 that may be used to employ embodiments described herein. The system architecture 400 may include an application 401, a filter manager 402, a file system stack 406, a disk FairShare manager 403, a classifier 404, and a scheduler 405. The system architecture 400 is merely one example of how the I/O module 205 might be structured. However, there is an infinite variety of architectures that may be used to implement such an I/O module 205, and as such FIG. 4 is provided only as a very specific example, and should not be used in any manner to unduly limit the claims.

In one embodiment, the filter manager 402 receives the file-level I/O requests from the application 401 and submits the file level I/O requests to the disk manager 403.

The disk manager 403 is responsible for receiving and passing file-level I/O requests. When the I/O module 205 receives file-level I/O requests, the disk manager 403 keeps records of each requester and re-submits the requests to the classifier 404. The classifier 404 then may create histories for each requester and may determine whether to delay the requests based on the histories.

If the classifier 404 determines to delay the requests, the requests are sent to the scheduler 405. In one embodiment, the scheduler 405 may maintain a queue for the delayed requests on a first-in-first-out basis. When the requests are moved from the queue after the delay, the scheduler 405 sends a Continue I/O signal to the disk manager 403, which re-submits the Continue I/O signal to the filter manager 403. Upon receiving the Continue I/O signal, the filter manager 403 passes the requests to the file system stack 406. In one embodiment, the classifier 404 may remove the requests from the queue maintained by the scheduler 405 during the delay and send Continue I/O signal to the disk manager 403. The filter manager 402 then passes the partially delayed request to the file system stack.

If the classifier 404 determines not to delay the requests, the requests are passed to the file system stack 406 directly, without have the requests delayed by or passed to the scheduler 405.

In one embodiment, when the requested operations are completed, the filter manager 402 may send an Operation Completed signal to the disk manager 403. The classifier then may update the histories of the requesters accordingly to reflect new statistics resulting from the completed operation.

Accordingly, mechanisms for fairly utilizing data storage channel amongst multiple users in a multi-user computing system has been described in a manner that each I/O request will be determined to be delayed or not to be delayed based on the requester's I/O history. In this way, if a user requested a large amount of I/O operations, his/her future requests may be delayed by the I/O module such that other users will not be negatively impacted by the users who exhaust the data storage channel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a multi-user computing system in which a plurality of users are accessing a data storage channel, a method for managing channel utilization for each of the plurality of users, the method comprising:
   an act of receiving a first file-level I/O request;
   an act of evaluating an I/O history of a first requester corresponding to the first file-level I/O request, the I/O history of the first requester including one or more previous requests by the first requester;
   an act of determining that the first file-level I/O request should be delayed from entering a file system stack based on a result of the act of evaluating the I/O history of the first requester;
   an act of causing the first file-level I/O request to be delayed by a component by queuing the first file-level I/O request for later processing by the file system stack, including:
      calculating a priority for the first requester, the priority being based at least in part on the I/O history of the first requester; and
      placing the first file-level I/O request in a queue and assigning the first file-level I/O request a priority within the queue based on the priority of the first requester;
   after the delay, an act of allowing the first file-level I/O request to be passed to the file system stack;
   an act of receiving a second file-level I/O request;
   an act of evaluating an I/O history of a second requester corresponding to the second file-level I/O request, the I/O history of the second requester including one or more previous requests by the second requester;
   an act of determining that the second file-level I/O request should not be delayed from entering the file system stack based on a result of the act of evaluating the I/O history of the second requester; and
   an act of allowing the second file-level I/O request to be passed to the file system stack without being delayed by the component, by bypassing the queue.

2. The method as recited in claim 1, wherein the first requester is the same as the second requester.

3. The method as recited in claim 1, wherein the first requester is different than the second requester.

4. The method as recited in claim 1, wherein the first requester and the second requester are included within the plurality of users.

5. The method as recited in claim 1, further comprising an act of creating a plurality of I/O histories, one for each of the plurality of users, wherein the plurality of I/O histories includes the I/O history of the first requester and the I/O history of the second requester.

6. The method as recited in claim 1, further comprising an act of creating an I/O history of each of a plurality of sessions.

7. The method as recited in claim 1, further comprising an act of using a filter manager above the file system stack, wherein the filter manager is configured to allow interception of a plurality of file-level I/O requests including the first file-level I/O request and the second file-level I/O request.

8. The method as recited in claim 7, further comprising an act of receiving a plurality of notifications indicating that the plurality of file-level I/O requests are completed.

9. The method as recited in claim 8, further comprising an act of updating an I/O history of a requester corresponding to a request based on the plurality of notifications, and an act of allowing a third file-level I/O request to be passed to the file system stack.

10. The method as recited in claim 1, wherein the act of causing the first file-level I/O request to be delayed further comprises:
   an act of removing the first file-level I/O request from the queue.

11. A computer program product comprising one or more computer-storage hardware device having thereon computer-executable instructions that, when executed by one or more processors of a computing system, cause the computing system to perform a method for managing channel utilization for each of a plurality of users in a multi-user network system in which the plurality of users are accessing a data storage channel, the method comprising:
- an act of receiving a first file-level I/O request;
- an act of evaluating an I/O history of a first requester corresponding to the first file-level I/O request, the I/O history of the first requester including one or more previous requests by the first requester;
- an act of determining that the first file-level I/O request should be delayed from entering a file system stack based on a result of the act of evaluating the I/O history of the first requester;
- an act of causing the first file-level I/O request to be delayed by a component, by queuing the first file-level I/O request for later processing by the file system stack, including:
  - calculating a priority for the first requester, the priority being based at least in part on the I/O history of the first requester; and
  - placing the first file-level I/O request in a queue and assigning the first file-level I/O request a priority within the queue based on the priority of the first requester;
- after the delay, an act of allowing the first file-level I/O request to be passed to the file system stack;
- an act of receiving a second file-level I/O request; an act of evaluating an I/O history of a second requester corresponding to the second file-level I/O request, the I/O history of the second requester including one or more previous requests by the second requester;
- an act of determining that the second file-level I/O request should not be delayed from entering the file system stack based on a result of the act of evaluating the I/O history of the second requester; and
- an act of allowing the second file-level I/O request to be passed to the file system stack without being delayed by the component, by bypassing the queue.

12. The computer program product as recited in claim 11, wherein at least one of the first and second requesters is a user.

13. The computer program product as recited in claim 11, wherein at least one of the first and second requesters is a session.

14. The computer program product as recited in claim 11, wherein the computer-executable instructions are further structured such that, when executed by the one or more processors, the computing system is further caused to perform the following:
- an act of using a filter manager above the file system stack, wherein the filter manager is configured to allow interception of the first and second file-level I/O requests.

15. The computer program product as recited in claim 11, wherein the computer-executable instructions are further structured such that, when executed by the one or more processors, the computing system is further caused to perform the following:
- an act of receiving a plurality of notifications indicating that the first and second file-level I/O requests are completed.

16. The computer program product as recited in claim 15, wherein the computer-executable instructions are further structured such that, when executed by the one or more processors, the computing system is further caused to perform the following:
- an act of updating the I/O history of the first or second requester based on one of the plurality of notifications.

17. The computer program product as recited in claim 11, wherein the act of causing the first file-level I/O request to be delayed further comprises following:
- an act of removing the first file-level I/O request from the queue.

18. A computing system comprising:
- at least one processor; and
- one or more storage media having stored thereon computer-executable instructions which, when executed by the at least one processor, implement a method managing channel utilization for each of a plurality of requesters in a multi-user network system in which the plurality of requesters are accessing a data storage channel, the method comprising:
  - an act of receiving a first file-level I/O request;
  - an act of evaluating an I/O history of a first requester corresponding to the first file-level I/O request, the I/O history of the first requester including one or more previous requests by the first requester;
  - an act of determining that the first file-level I/O request should be delayed from entering a file system stack based on a result of the act of evaluating the I/O history of the first requester;
  - an act of causing the first file-level I/O request to be delayed by a component by queuing the first file-level I/O request for later processing by the file system stack, including:
    - calculating a priority for the first requester, the priority being based at least in part on the I/O history of the first requester; and
    - placing the first file-level I/O request in a queue and assigning the first file-level I/O request a priority within the queue based on the priority of the first requester;
  - after the delay, an act of allowing the first file-level I/O request to be passed to the file system stack;
  - an act of receiving a second file-level I/O request;
  - an act of evaluating an I/O history of a second requester corresponding to the second file-level I/O request, the I/O history of the second requester including one or more previous requests by the second requester;
  - an act of determining that the second file-level I/O request should not be delayed from entering the file system stack based on a result of the act of evaluating the I/O history of the second requester; and
  - an act of allowing the second file-level I/O request to be passed to the file system stack without being delayed by the component, by bypassing the queue.

* * * * *